United States Patent [19]

Maeda et al.

[11] Patent Number: 4,563,760
[45] Date of Patent: Jan. 7, 1986

[54] METHOD OF DETECTING LIGHT SPOT CONTROL SIGNAL

[75] Inventors: Takeshi Maeda, Kokubunji; Kazuo Shigematsu, Saitama; Masahiro Takasago; Yasumitsu Mizoguchi, both of Odawara; Zenji Tsutsumi, Kokubunji; Yoshito Tsunoda, Mitaka; Motoo Uno, Kokubunji, all of Japan

[73] Assignee: Hitachi, Ltd., Tokyo, Japan

[21] Appl. No.: 401,020

[22] Filed: Jul. 22, 1982

[30] Foreign Application Priority Data

Sep. 4, 1981 [JP] Japan .................... 56-138583

[51] Int. Cl.$^4$ ............................... G11B 7/00
[52] U.S. Cl. .......................... 369/44; 369/45; 250/201
[58] Field of Search ................. 369/43–46, 369/109–111; 358/342; 250/202, 201, 201 DF

[56] References Cited

U.S. PATENT DOCUMENTS

| | | | |
|---|---|---|---|
| 3,876,842 | 4/1975 | Bouwhuis | 369/46 |
| 3,913,076 | 10/1975 | Lehureau et al. | 369/44 |
| 3,944,727 | 3/1976 | Elliott | 369/44 |
| 4,057,833 | 11/1977 | Braat | 369/46 |
| 4,118,735 | 10/1978 | Wilkinson | 369/44 |
| 4,165,519 | 8/1979 | Goto | 369/46 |
| 4,223,347 | 9/1980 | Bouwhuis et al. | 369/44 |
| 4,232,337 | 11/1980 | Winslow | 369/44 |
| 4,243,850 | 1/1981 | Edwards | 369/46 |
| 4,359,635 | 11/1982 | Gross | 369/44 |

*Primary Examiner*—Robert L. Richardson
*Attorney, Agent, or Firm*—Antonelli, Terry & Wands

[57] ABSTRACT

A method of detecting a light spot control signal is disclosed in which, when information is reproduced from an optical disk for optically recording information, a signal level obtained at a high-reflectivity portion of the optical disk is taken out of a signal reproduced from the optical disk, and is used as a control signal, which controls a light spot so that it tracks information stored in the optical disk.

7 Claims, 11 Drawing Figures

F I G. 3
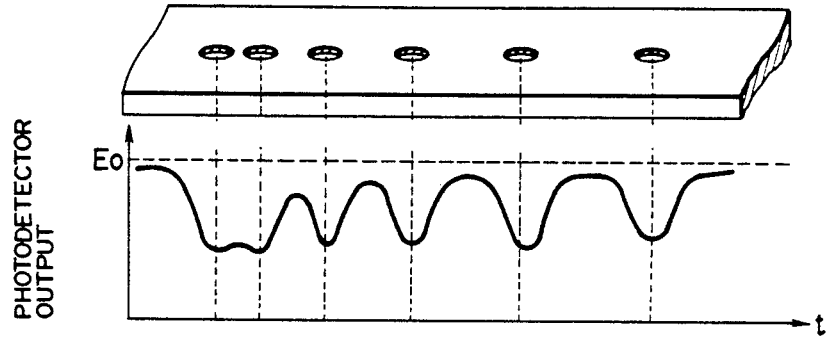
F I G. 4
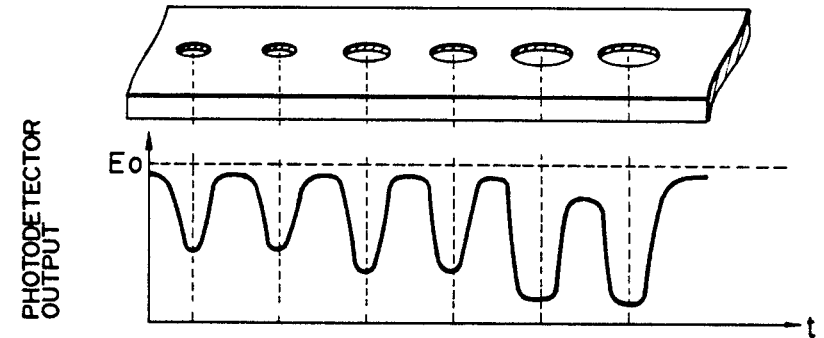

F I G. 7
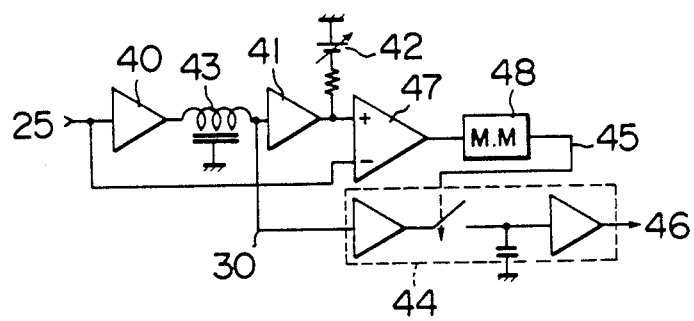
F I G. 8
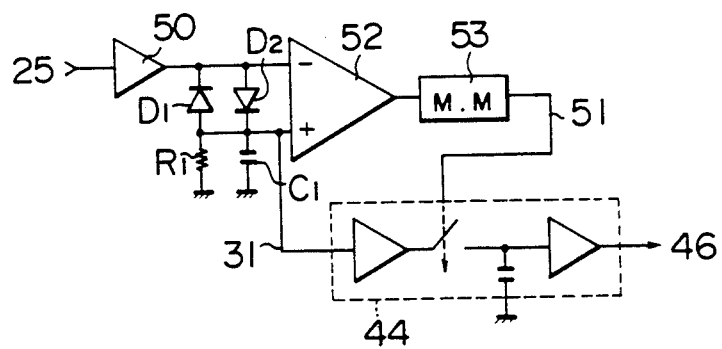

METHOD OF DETECTING LIGHT SPOT CONTROL SIGNAL

The present invention relates to a method of controlling a light spot, and more particularly to a method of controlling a light spot in the so-called optical disk for optically recording/reproducing information.

An information processing device usually called a digital optical disk has been proposed in which a laser beam is focussed on a rotating disk which is formed by evaporating an information recording medium (for example, a metal film) on a predetermined substrate, to irradiate the information recording medium with a light spot having a spot size of about 1 μm, information is recorded in the disk in such a manner that a series of holes (namely, pits) are thermally made in the information recording medium by modulating the intensity of the light beam, and the information thus recorded is reproduced in a manner that a weak laser beam is focussed on the information recording medium and a change in the intensity of reflected light caused by each pit is detected. Such a proposal is described in an article entitled "Ten Billion Bits Fit onto Two Sides of 12-inch Disc" (Electronics, Nov. 23, 1978, Page 75).

The above-mentioned information processing device has, for example, such a typical structure as shown in FIG. 1. That is, a disk 3 having a diameter of about 30 cm is rotated on a shaft 4 by an electric motor 5 in the direction as indicated with an arrow. An optical head 2 made up of a laser beam source and an optical system is mounted on a swing arm actuator 1 such as used for a magnetic disk, and is driven in a radial direction of the disk 3. A method of recording and reproducing information in the above-mentioned structure will be explained, with reference to FIG. 2, which is an enlarged view showing a structure of a portion of the disk 3 shown in FIG. 1.

A layer made of, for example, an ultraviolet ray setting resin and provided with the so-called guide groove 13 is formed on a glass or plastic substrate 11 so that a cross section of the layer includes a large number of recesses each having appropriate width and depth. A metal film 10 is deposited on the layer by evaporation. A light spot from the optical head 2 is guided along the guide groove 13 to make pits 12 in accordance with predetermined information. When the information thus recorded is reproduced, a light spot is moved along the guide groove 13 to measure the quantity of reflected light. Further, a signal for controlling a light spot is also detected from the quantity of reflected light.

The signal for controlling a light spot is mainly composed of a focal deviation detecting signal for detecting the so-called focal deviation caused by the vertical movement of the disk, and a tracking deviation detecting signal for detecting the so-called tracking deviation, that is, the deviation of the center of a light spot from the center line of the guide groove. The wording "focal deviation" means that a light spot is not precisely focussed on a surface of the disk but is focussed on a position above or below the surface of the disk. The wording "tracking deviation" means that the center of a light spot does not coincide with the center line of the guide groove, that is, the light spot cannot precisely track the above-mentioned pits. Such detecting signals as discussed above are produced from light reflected from the disk as will be described below.

FIGS. 3 and 4 show relations between the pits and the output signal of a photodetector for converting the quantity of reflected light into an electric signal. In FIG. 3 pits having a constant diameter are arranged in a manner that the distance between adjacent pits is varied. Each of the pits is smaller in reflectivity than the metal film and therefore the output signal becomes small at each pit. Accordingly, when a series of pits are made as shown at (a) of FIG. 3, the output signal has a waveform as shown at (b) of FIG. 3. Meanwhile, in FIG. 4, pits having different diameters are arranged in such a manner that the distance between the centers of adjacent pits is kept constant. When a series of pits are made as shown at (a) of FIG. 4, the output signal has a waveform as shown at (b) of FIG. 4.

As shown in FIGS. 3 and 4, the quantity of reflected light at a pit position is decreased from the quantity of reflected light at the metal film in accordance with the size of the pit and the distance from an adjacent pit. Accordingly, the level of a control signal is greatly affected by the presence or absence of pit, and therefore respective gains of an automatic focussing system and an automatic tracking control system vary in response to the presence or absence of pit. When the gains of these control systems vary, there arises a problem that the pull-in action of each control system and the tracking accuracy are deteriorated. Incidentally, reference symbol $E_o$ at (b) of FIGS. 3 and 4 designates an ideal level of the output signal obtained at the metal film:

In order to overcome the above-mentioned problem, there has been hitherto known a method in which, based upon a difference between the frequency band of pits and that of the control signal, the output signal of the photodetector is applied to a low-pass filter to use a mean value of the output signal from the filter as the control signal. However, as shown in FIG. 5a, the mean value of the output signal of the photodetector is decreased as indicated by a dot-dash line 20, due to modulated information signals, that is, a pit pattern of input information.

An object of the present invention is to provide a method of controlling a light spot by a control signal whose amplitude is not affected by the presence or absence of pits.

In order to attain the above object, according to the present invention, only a reflection signal from a metal surface is selectively detected to produce a control signal, and the detected value is held unchanged or a decrease in the detected value due to information pits is made small.

Now, the present invention will be explained with reference to the drawings, in which.

Figure 1:
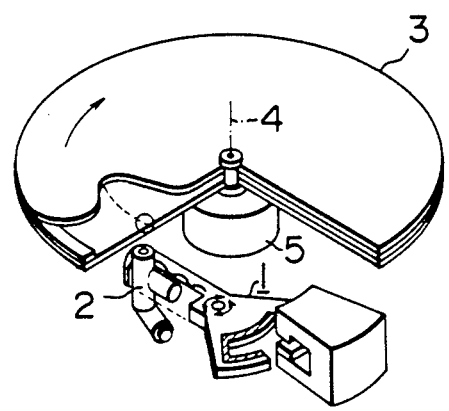
FIG. 1 is a diagrammatic perpsective view showing an information processing device using an optical disk.
Figure 2:
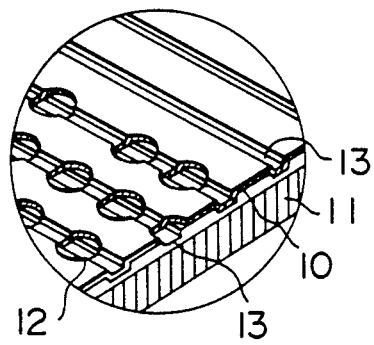
FIG. 2 is a fragmentary enlarged view for explaining the structure of the optical disk shown in FIG. 1.
Figure 5A:
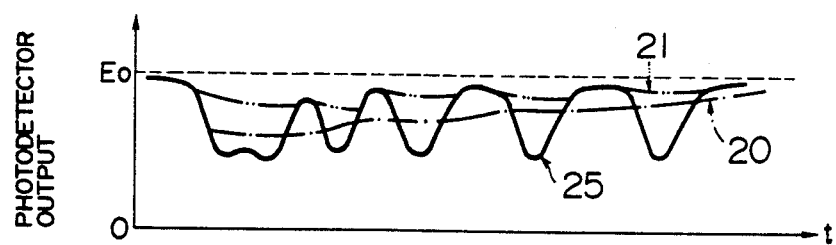
Figure 5B:
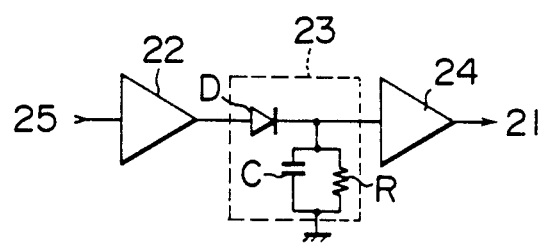

FIGS. 3(a) and (b) and 4(a) and (b) show relations between recording pits and a waveform of reproduced signal;

FIGS. 5a and 5b show a waveform obtained in an embodiment of the present invention and a circuit used therein; and FIGS. 6 to 8 and FIGS. 9a and 9b are views for explaining some preferred embodiments of the present invention.

An embodiment of the present invention will be explained by reference to FIG. 5b. FIG. 5a shows an output signal 25 of a photodetector used for detecting a control signal, and a dot-dash line 20 in FIG. 5a indicates a mean value of the output signal 25. Referring now to FIG. 5b, the output signal 25 is applied to a buffer amplifier 22, the output of which is applied to an envelope detection circuit 23 (which is made up of a diode D, a capacitor C and a resistor R). The output of the detection circuit 23 is applied to a buffer amplifier 24, which delivers a signal 21 such as shown in FIG. 5a. In the circuit configuration shown in FIG. 5b, a time constant determined by the capacitor C and resistor R of the detection circuit 23 is made far larger than a period of changes in the output signal 25 and far smaller than a time constant corresponding to a frequency band necessary for the control signal. According to this embodiment, a signal level corresponding to the quantity of reflected light from the metal film is held during the time constant determined by the capacitor C and resistor R, and therefore the level of the signal 21 is not affected by the presence or absence of pit.

Figure 6:
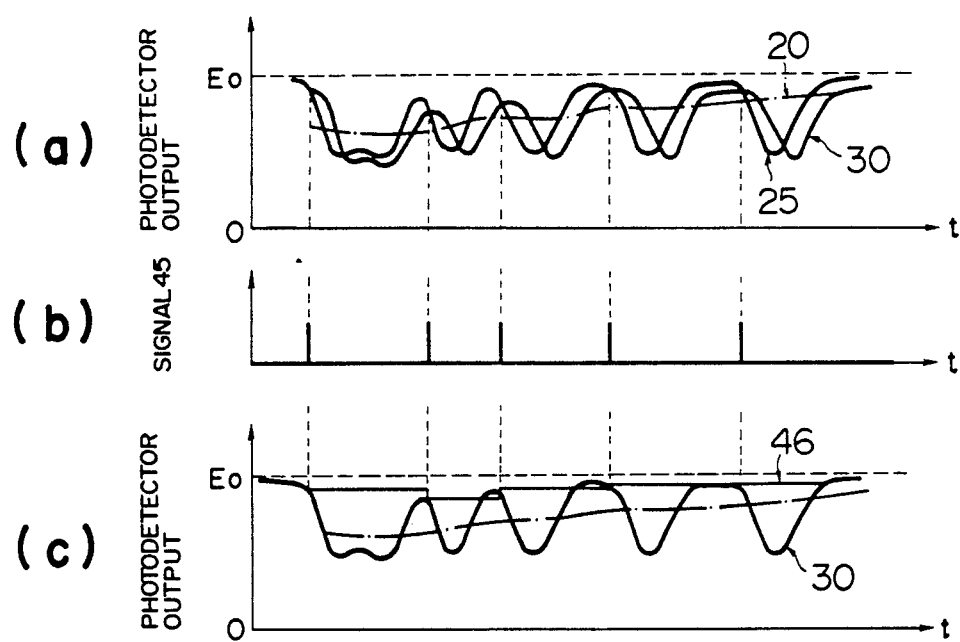

Next, another embodiment of the present invention will be explained with reference to FIGS. 6 to 8. FIG. 7 shows an actual circuit configuration used in the present embodiment. Referring to FIG. 7, the output signal 25 is applied to a delay line 43 (that is, a delay circuit) through a buffer amplifier 40, to be delayed by an appropriate time. An output signal 30 from the delay circuit 43 is applied to a buffer amplifier 41 and a sample/hold circuit 44. The output signal 30 applied to the buffer amplifier 41 passes through the amplifier 41 and is then added to a predetermined voltage from a bias source 42. A sum voltage thus obtained is applied to one input terminal of a comparator 47. The bias source 42 may be omitted since it is used only for setting an operating level of the comparator 47. The other input terminal of the comparator 47 is applied with the output signal 25. Thus, the signals applied to the input terminals of the comparator 47 have such waveforms 20 and 25 as shown at (a) of FIG. 6, and the output of the comparator 47 rises at the point of intersection of the signals 25 and 30. The output of the comparator 47 is applied to a monostable multivibrator 48, which generates pulses 45 such as shown at (b) of FIG. 6 in response to each rise in the output of the comparator 47. Each of the pulses 45 has a width necessary to the sampling operation of the sample/hold circuit 44. The pulses 45 substantially indicate position on the metal film. Accordingly, when the delayed signal 30 is supplied to the sample/hold circuit 44 and sampling and holding operations are performed in response to the pulses 45, the circuit 44 delivers a signal 46 such as shown at (c) of FIG. 6, that is, a signal level coresponding to the metal film is detected and held.

FIG. 8 shows a simplified version of the circuit configuration shown in FIG. 7. In the circuit shown in FIG. 8, a bias voltage is obtained from the forward voltages of diodes $D_1$ and $D_2$, and the output signal 25 is delayed by a time constant which is mainly determined by the capacitance of a capacitor $C_1$ and the resistance of a resistor $R_1$. A buffer amplifier 50, a comparator 52 and a monostable multivibrator 53 perform the same operations as corresponding ones shown in FIG. 7. A pulse signal 51 from the monostable multivibrator 53 is supplied to the sample/hold circuit 44 as a control signal for the circuit 44, and an input signal of the comparator 52 is applied to the sample/hold circuit 44 as the input signal thereof.

Further, a data signal detecting circuit in a digital optical disk device detects those portions of the output signal 25 which correspond to the pits. In the course of this detecting operation, a signal corresponding to the metal film such as obtained in the above-mentioned embodiments may be generated. The sample/hold circuit 44 may use this signal as its control signal.

Figure 9A:
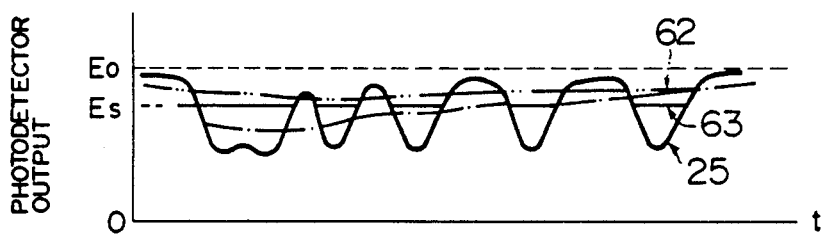
Figure 9B:
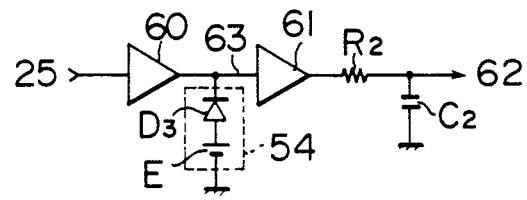

FIGS. 9a and 9b are views for explaining a further embodiment of the present invention. Referring to FIG. 9b, the output signal 25 is supplied through a buffer amplifier 60 to a slicing circuit 54, which is made up of a diode $D_3$ and a power source E. A slice level $E_s$ is set as shown in FIG. 9a, by the power source E. Thus, a signal 63 such as shown in FIG. 9a is applied to a buffer amplifier 61, the output of which is applied to a low-pass filter made up of a resistor $R_2$ and a capacitor $C_2$. The low-pass filter delivers a signal 62 such as shown in FIG. 9a. As is apparent from FIG. 9a, the signal 62 is scarcely affected by the pits. In the circuit shown in FIG. 9b, a time constant determined by the resistor $R_2$ and capacitor $C_2$ is required to be larger than a period of the pits and smaller than a time constant determined by a control frequency band.

As has been explained in the foregoing description, according to the present invention, variations in the control signal corresponding to the presence or absence of pit can be eliminated, and therefore the pull-in action of each control system and the tracking accuracy can be improved.

Now, the present invention will be compared with the prior art method, in the case where the size of a light spot is equal to 1.6 μm, the diameter of pits is varied in a range from 0.6 to 1.0 μm, and a pitch in arranging the pits is varied in a range from 0.8 to 2.5 μm, by way of example. A variation of about 6 dB in mean value of the output signal 25 was produced in the prior art method. According to the present invention, variations in mean value of the output signal can be made less than 1 dB.

We claim:

1. A method of detecting a light spot control signal, comprising the steps of:
   irradiating an information recording medium with a light beam so as to direct a light spot onto a track provided on the recording medium, the track having pits formed therein by irradiation of the recording medium with a light beam modulated by an information signal;
   converting light reflected from the recording medium into a first electric signal corresponding to the reflected light;
   producing a second electric signal from the first electric signal wherein the second electric signal is representative of the level of the portions of the first electric signal which correspond to light reflected from the recording medium where no pit is formed; and
   utilizing the second electric signal to generate the light spot control signal.

2. A method according to claim 1, wherein the step of producing the second electric signal includes envelope-detecting the first electric signal.

3. A method according to claim 2, wherein the step of envelope-detecting includes envelope-detecting the first electric signal with a time constant of the envelope detection being larger than a period of the first electric signal and smaller than a period corresponding to a frequency of the frequency band of the light spot control signal.

4. A method according to claim 1, wherein the first electric signal has a waveform of peaks and valleys in which the peak portions correspond to light reflected from the recording medium where no pit is formed and the valley portions correspond to light reflected from the recording medium where a pit is formed, the second electric signal being produced in accordance with the peak portions of the first electric signal.

5. A method according to claim 4, wherein the step of producing the second electric signal includes envelope-detecting the peak portions of the first electric signals.

6. A method according to claim 1, wherein the step of producing the second electric signal includes comparing the first electric signal with a predetermined value which varies in dependence upon the first electric signal, and sampling and holding the first electric signal on the basis of the results of the comparison.

7. A method according to claim 1, wherein the step of producing the second electric signal includes slicing the first electric signal at a predetermined level, applying the sliced first electric signal to a low-pass filter, and utilizing an output of the low-pass filter.

* * * * *